United States Patent
Kumar et al.

(10) Patent No.: US 11,122,506 B2
(45) Date of Patent: Sep. 14, 2021

(54) IDLE CONNECTION OPTIMIZATION FOR WIRELESS DEVICES

(71) Applicant: Intel Corporation, Santa Clara, CA (US)

(72) Inventors: Sunil Kumar, Cupertino, CA (US); Hakan Magnus Eriksson, Portland, OR (US); Sebastien Fievet, Santa Clara, CA (US); Oren Haggai, Kefar Sava (IL); Izoslav Tchigevsky, Portland, OR (US); Udi Shtalrid, Beer-Yacov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/728,029

(22) Filed: Dec. 27, 2019

(65) Prior Publication Data

US 2021/0204212 A1    Jul. 1, 2021

(51) Int. Cl.
*H04W 52/02* (2009.01)
*H04W 74/06* (2009.01)
*H04W 84/18* (2009.01)

(52) U.S. Cl.
CPC ....... *H04W 52/0229* (2013.01); *H04W 74/06* (2013.01); *H04W 84/18* (2013.01); *Y02D 30/70* (2020.08)

(58) Field of Classification Search
CPC ........ Y02D 30/70; H04W 4/80; H04W 84/12; H04W 52/0229; H04W 74/06
See application file for complete search history.

(56) References Cited

U.S. PATENT DOCUMENTS

| | | | | |
|---|---|---|---|---|
| 7,864,720 | B2* | 1/2011 | Jeyaseelan | H04W 52/0235 370/311 |
| 8,600,427 | B2 | 12/2013 | Ibrahim et al. | |
| 8,964,586 | B2* | 2/2015 | Xhafa | H04W 76/10 370/252 |
| 9,288,759 | B2* | 3/2016 | Kerai | H04W 84/20 |
| 10,237,193 | B2* | 3/2019 | Chen | H04W 72/10 |
| 10,716,066 | B2* | 7/2020 | Huang | H04W 52/0229 |
| 10,849,069 | B2* | 11/2020 | Peavey | H04W 52/0229 |
| 2010/0302979 | A1* | 12/2010 | Reunamaki | H04W 52/0225 370/311 |
| 2014/0189409 | A1* | 7/2014 | Jeyaseelan | G06F 13/102 713/324 |
| 2018/0084558 | A1* | 3/2018 | Chen | H04W 12/06 |
| 2020/0044769 | A1* | 2/2020 | Neelisetty | H04L 1/0013 |

* cited by examiner

*Primary Examiner* — Brian T Misiura
(74) *Attorney, Agent, or Firm* — Schwegman Lundberg & Woessner, P.A.

(57) ABSTRACT

Methods, apparatus, and computer-readable media are described to encode, by a first station (STA), a polling signal for periodic transmission to a second STA during each air activity instance of a plurality of air activity instances. The first STA detects an interface between a MAC layer and a software stack of a communication protocol is in a low-power state. The communication protocol is associated with a communication link between the first STA and the second STA. An empty packet from the second STA is decoded. The empty packet is received in response to the polling signal transmitted during an air activity instance of the plurality of air activity instances. The periodicity of the periodic transmission of the polling signal is adjusted based on the detected low-power state and the decoded empty packet.

25 Claims, 12 Drawing Sheets

US 11,122,506 B2

1

IDLE CONNECTION OPTIMIZATION FOR WIRELESS DEVICES

TECHNICAL FIELD

Various embodiments generally may relate to the field of wireless communications. Some embodiments relate to wireless local area networks (WLANs) and Wi-Fi networks including networks operating in accordance with the IEEE 802.11 family of standards. Some embodiments relate to IEEE 802.11ax and/or low power communications standards, e.g., Bluetooth. Some embodiments relate to methods, computer-readable media, and apparatus for power optimization in wireless devices, including power optimization for idle connections with low energy (LE) human interface devices (HIDs) or other types of wireless devices.

BACKGROUND

The efficient use of the resources of a wireless local-area network (WLAN) and individual wireless devices is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

It is prevalent to use LE HID-type devices (e.g., computer mice, keyboards, etc.) with a personal computer (e.g., a laptop). However, LE technology architectures within personal computer platforms coupled with LE HID over-the-air-protocol leads to significant, and thereby unacceptable, platform power consumption in platform low power states (e.g., Modern Connected Standby) only to maintain a connection with an idle HID device.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

2

Figure 8:
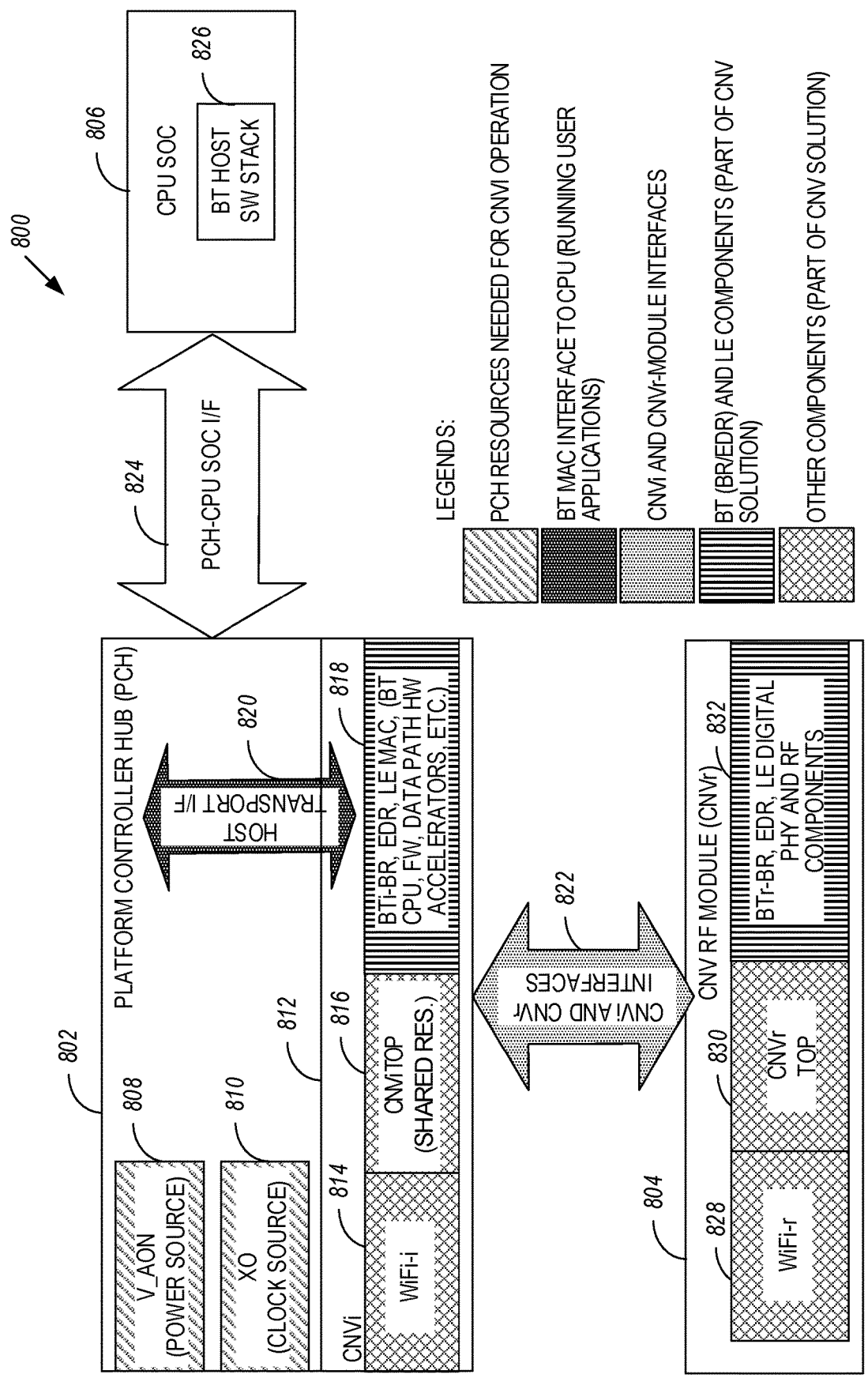
Figure 9:
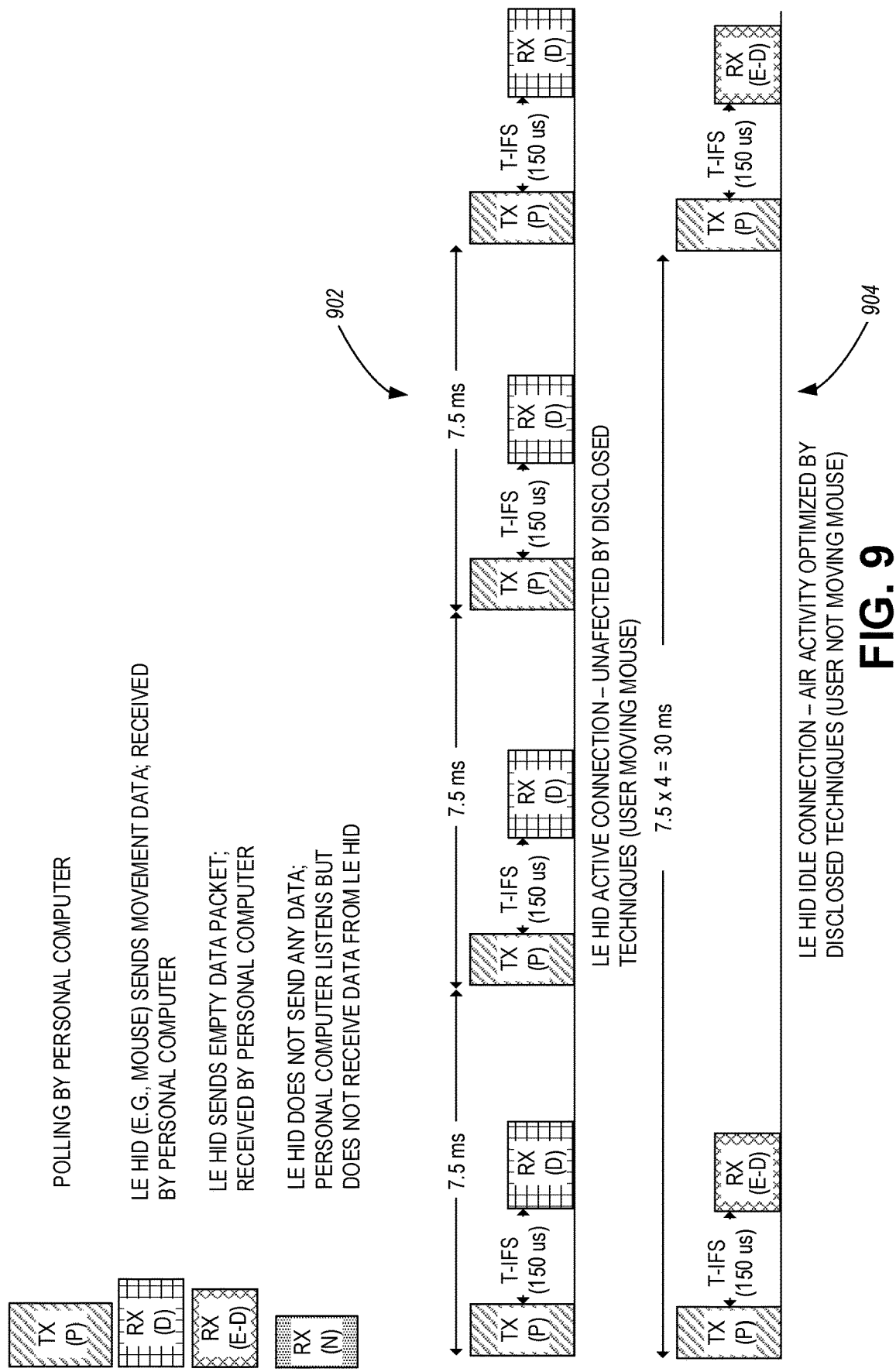
Figure 10:
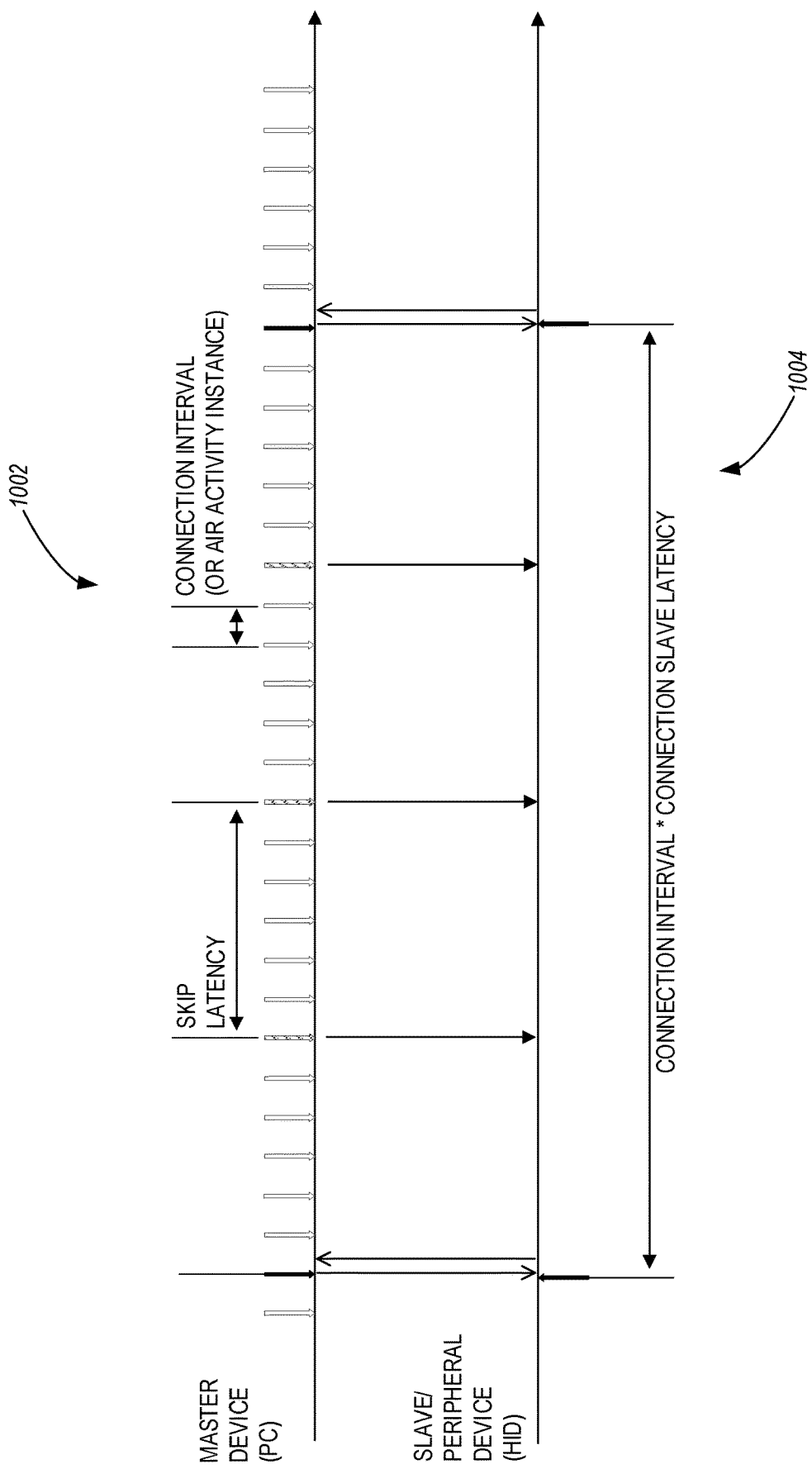
Figure 11:
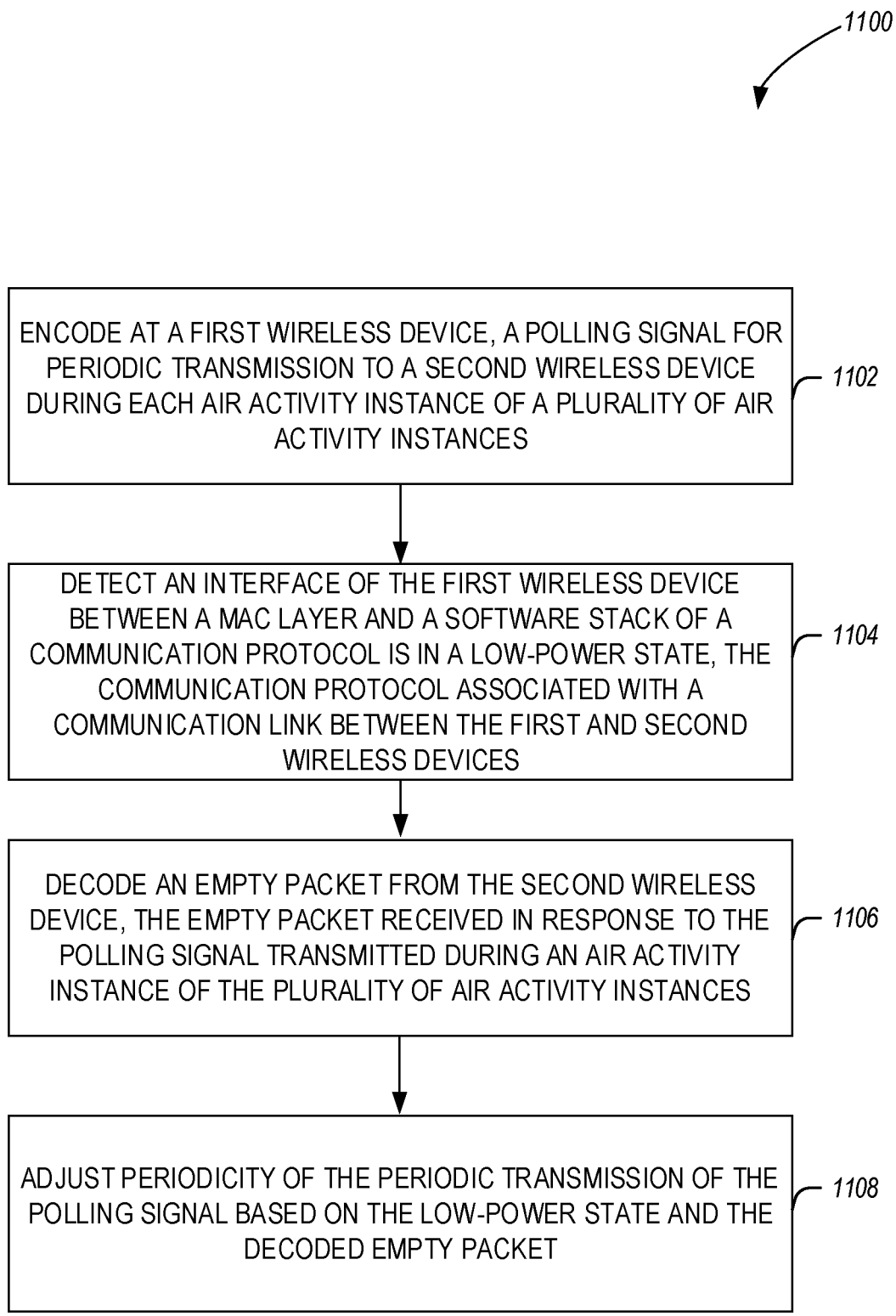
Figure 12:
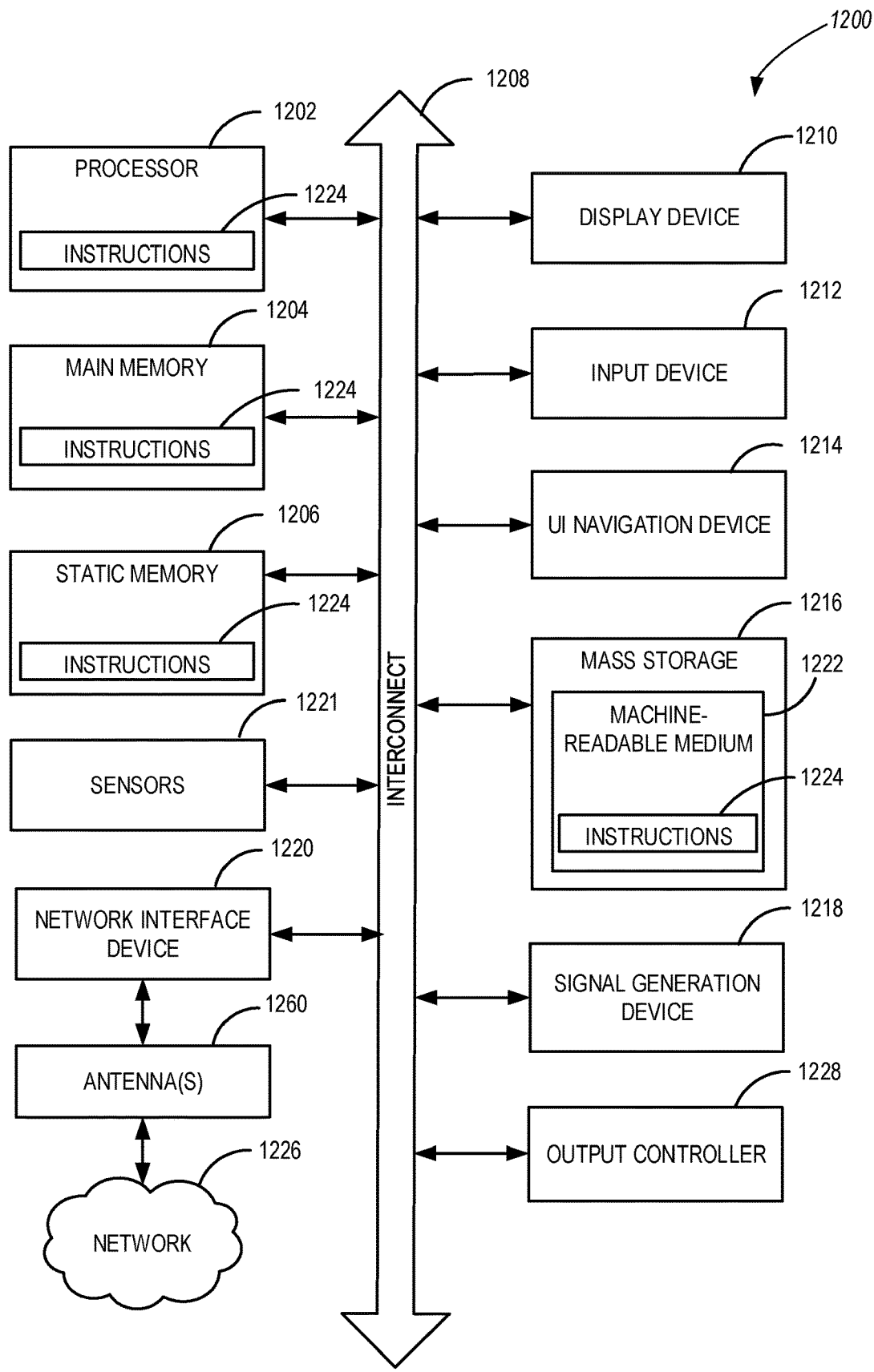
Figure 13:
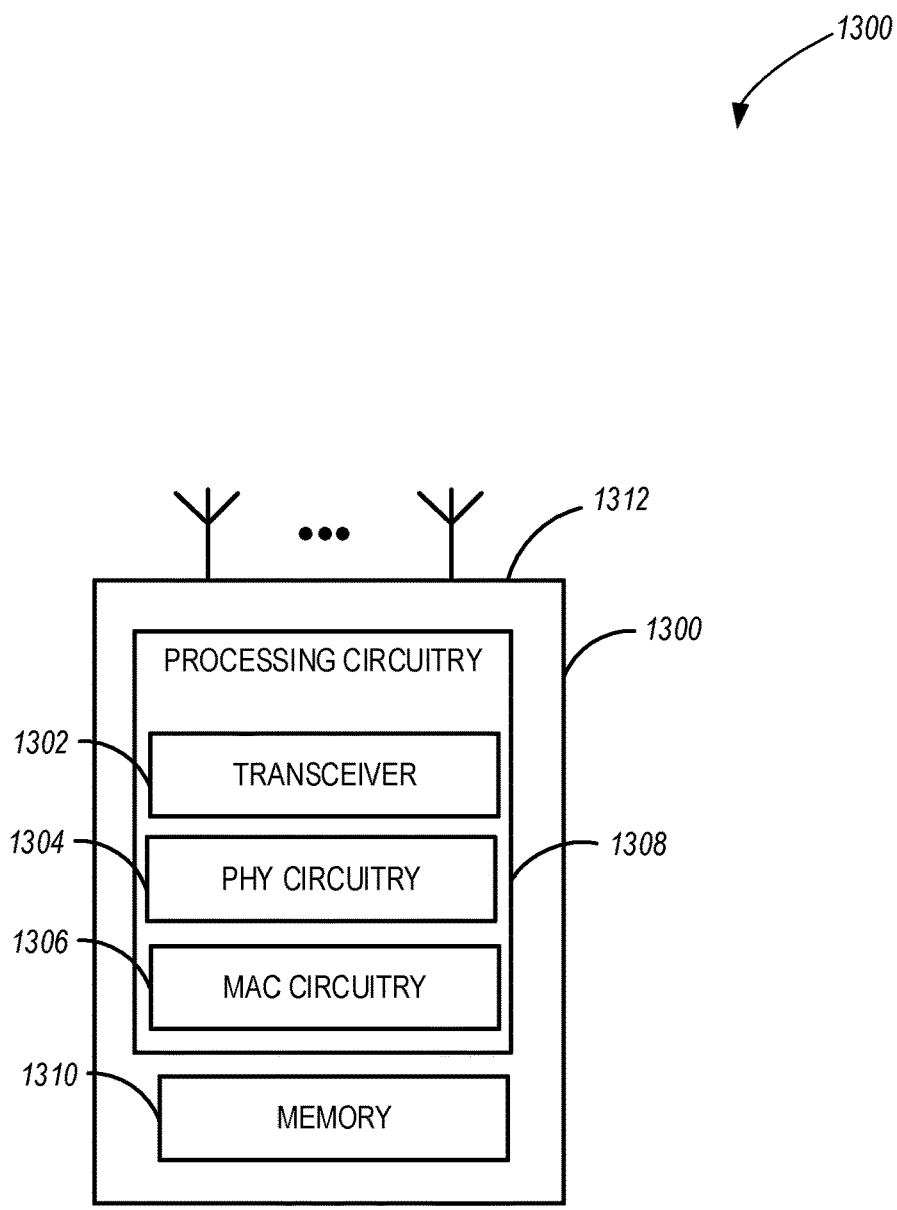

FIG. 8 illustrates a block diagram of a LE architecture of a primary device in communication with a LE HID device, in accordance with some embodiments;

FIG. 9 illustrates a timing diagram of example LE HID active and idle connections with air activity optimized in the idle connection, in accordance with some embodiments;

FIG. 10 illustrates a timing diagram of skipped primary device polling transmissions, in accordance with some embodiments;

FIG. 11 is a flow diagram of a method for optimizing power consumption in a wireless device in an idle connection with another wireless device, in accordance with some embodiments;

FIG. 12 illustrates a block diagram of an example machine upon which any one or more of the operations/techniques (e.g., methodologies) discussed herein may perform; and FIG. 13 illustrates a block diagram of an example wireless device upon which any one or more of the techniques (e.g., methodologies or operations) discussed herein may perform.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

Aspects of the disclosure relate to power optimization in wireless devices, such as LE HID-type devices while in idle state. More specifically, techniques discussed herein relate to optimizing power consumption of computing devices (e.g., a primary device or another computing device including wired or wireless devices) associated with an idle connection with another computing device (e.g., a secondary device such as a LE HID-type device or another computing device in a secondary configuration with the primary device), and can be used to optimize platform power consumption while minimizing degradation to the user experience. In existing solutions for HID power consumption optimization, the HID device typically terminates the idle connection after a pre-configured/static duration of inactivity on the connection (e.g., 10 minutes). Additionally, a connection configuration exists which dictates how many air activity instances the HID device may skip listening and responding to. An HID device may use this configuration to conserve its battery when it is idle and hence, does not have any data to send. The existing solutions, however, are associated with the following disadvantages:

(a) The preconfigured/static connection termination timeout typically is 10s of minutes (where s is a positive integer). During these 10s of minutes when the connection is idle, while the HID device has a connection configuration mechanism to preserve its battery, there are no such mechanisms available to the primary device (e.g., the personal computer or another computing device connected to the HID device). Consequently, the primary device consumes unacceptable power during platform low power states (e.g., during the Modern Connected Standby state or another low power state); and (b) There might be HID devices that may not terminate the connection even after 10s of minutes' inactivity on the connection. The primary device (e.g., personal computer) platform power consumption may increase beyond efficiency thresholds when operating with such HID devices.

Techniques discussed herein include decreasing the frequency of air activity (e.g., decreasing the periodicity of communicating a polling signal to a LE HID device based on determining a communication link with the HID device is idle), to allow longer inactivity/quiet periods. In some aspects, techniques discussed herein can be used to determine the number of activity instances that can be skipped for purposes of decreasing the polling signal periodicity. The longer, quiet periods of non-polling enable platform transition to deeper sleep modes for a meaningful time period, which in turn improves the platform power consumption. The decreases in polling frequency do not cause perceivable degradation to user experience, which may be ensured by employing the discussed techniques only when the HID device is already inactive and other relevant system components are already in deep sleep state.

Figure 1:
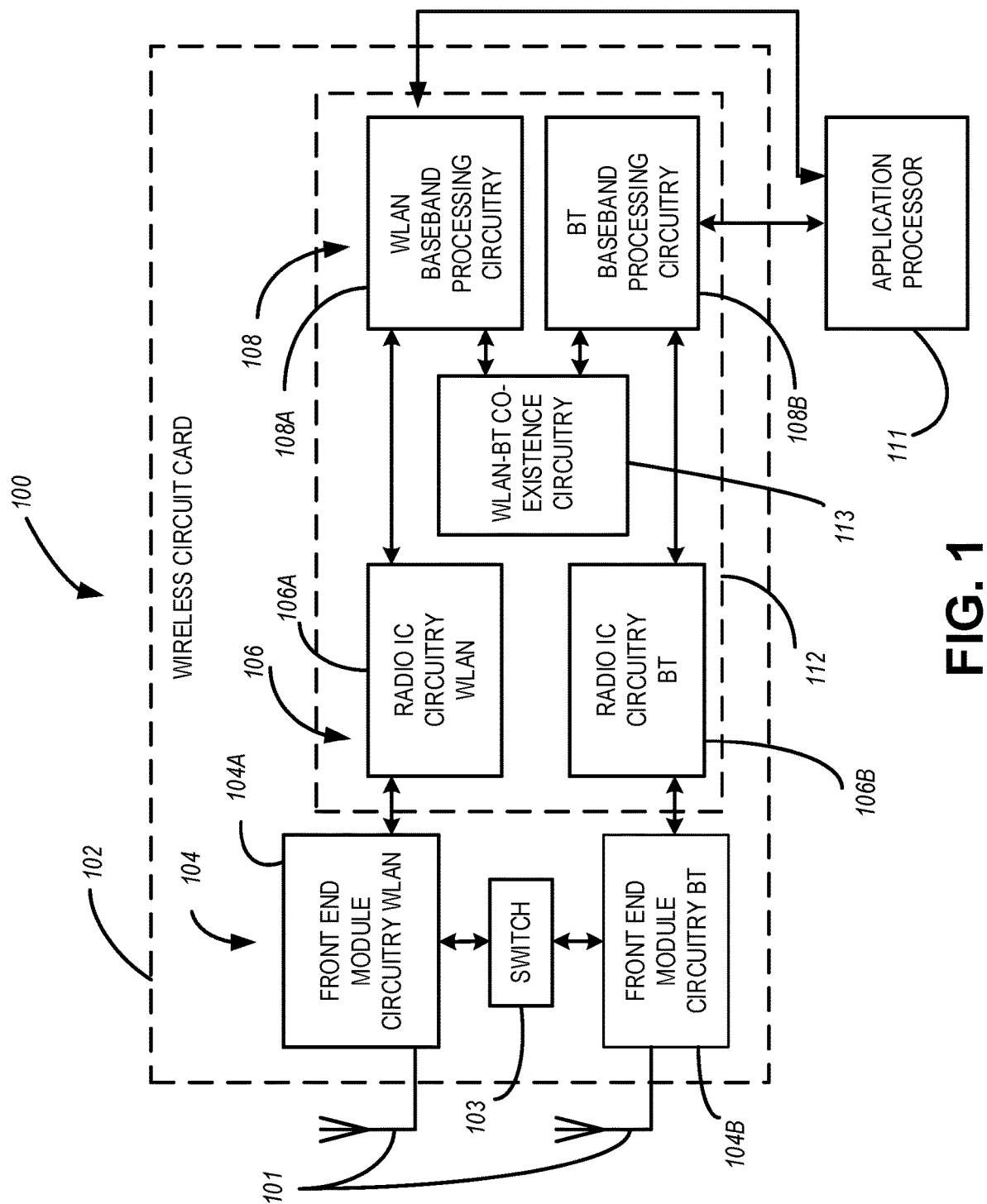
FIG. 1 is a block diagram of a radio architecture in accordance with some embodiments.

FIG. 1 is a block diagram of a radio architecture 100 in accordance with some embodiments. The radio architecture 100 may be implemented in a primary device coupled to a LE HID-type device or another type of slave secondary device. The radio architecture 100 may include radio front-end module (FEM) circuitry 104, radio IC circuitry 106, and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 102, to amplify the received signals and to provide the amplified versions of the received signals to the BT radio IC circuitry 106B for further processing. The FEM circuitry 104A may also include a transmit signal path which may include circuitry configured to amplify WLAN signals provided by the radio IC circuitry 106A for wireless transmission by one or more of the antennas 101. In addition, the FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. The BT radio IC circuitry 106B may, in turn, include a receive signal path which may include circuitry to down-convert BT RF signals received from the FEM circuitry 104B and provide baseband signals to BT baseband processing circuitry 108B. The WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. The BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform (FFT) or Inverse Fast Fourier Transform (IFFT) block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with the application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers. In some embodiments, the wireless radio card 102 may include a platform controller hub (PCH) system-on-a-chip (SOC) and a central processing unit (CPU)/host SOC. Example embodiments of a PCH SOC and CPU SOC in connection with the discussed techniques are illustrated in FIG. 8.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, IEEE 802.11-2016, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection-oriented (SCO) link and or a BT low energy (BT LE) link.

In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

Figure 2:
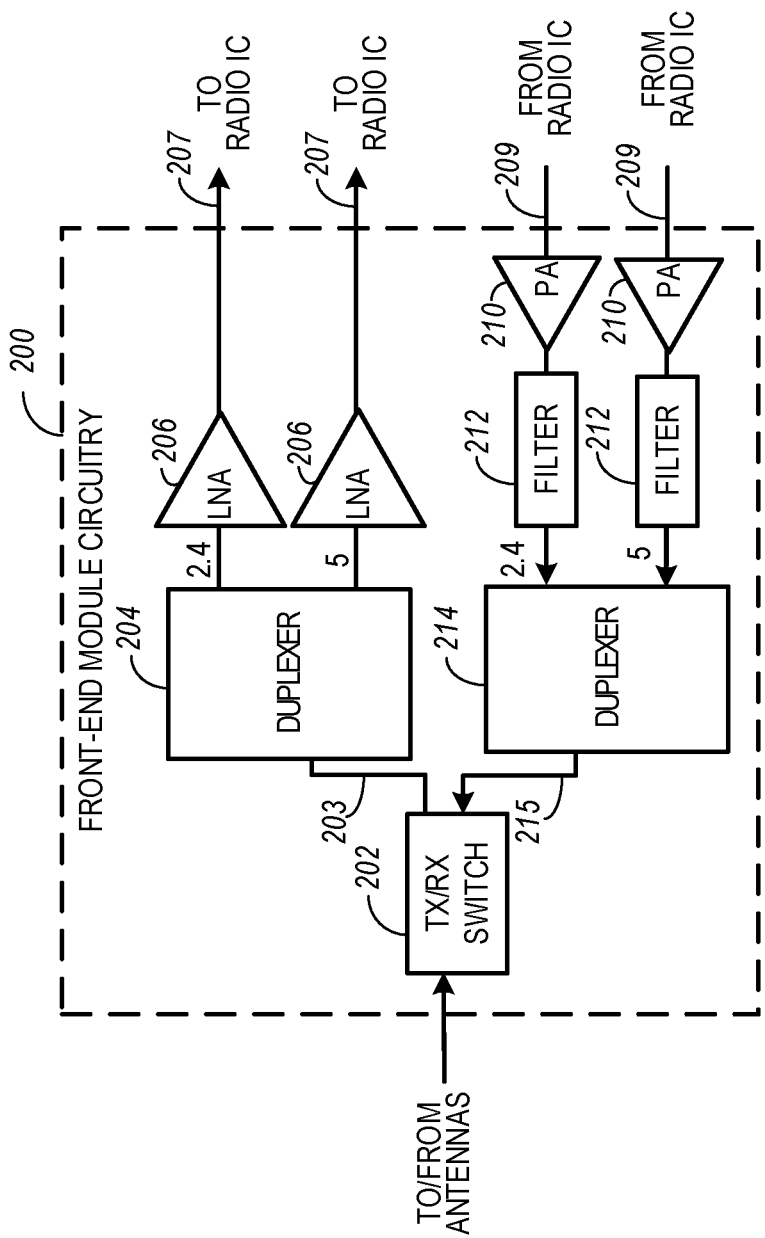
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit (TX) mode and receive (RX) mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, an LPF or another type of filter for each frequency spectrum, and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHz signal paths and may utilize the same FEM circuitry 200 as the one used for WLAN communications.

Figure 3:
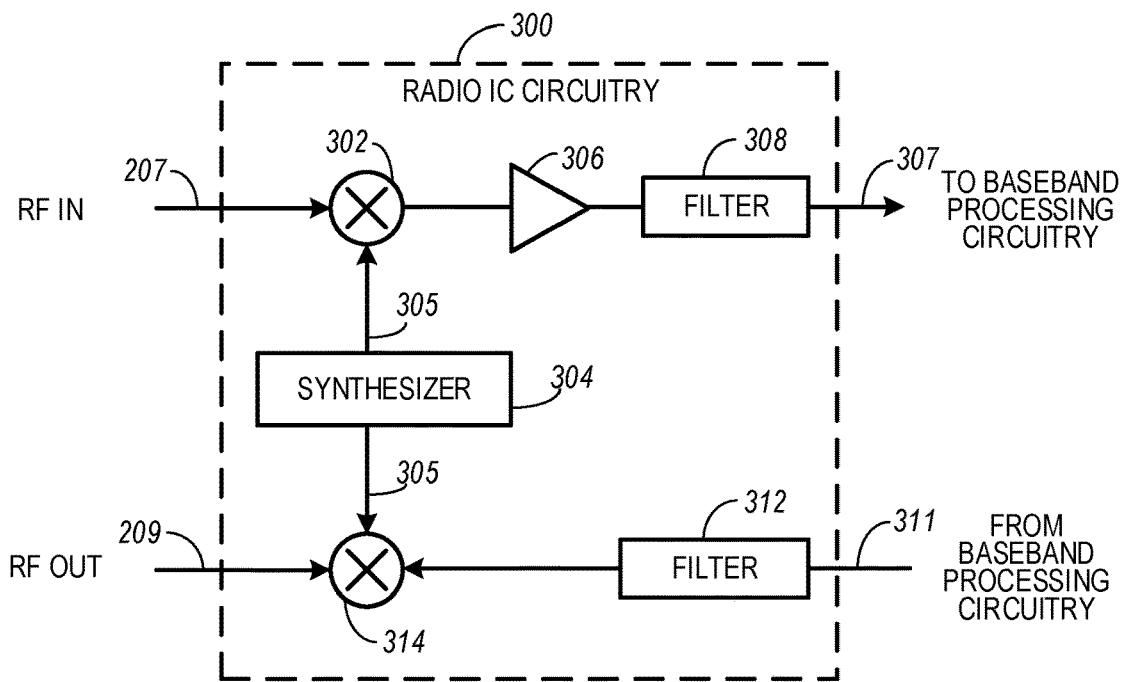
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include an LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include an LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature-phase (Q) paths). In such an embodiment, RF input signal 207 from FIG. 2 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in the duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature-phase (Q) path) may operate at a 25% duty cycle, which may result in a significant reduction in power consumption.

The RF input signal 207 (FIG. 2) may comprise a balanced signal, although the scope of the embodiments is not limited in this respect. The I and Q baseband output signals may be provided to the low-noise amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include an analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
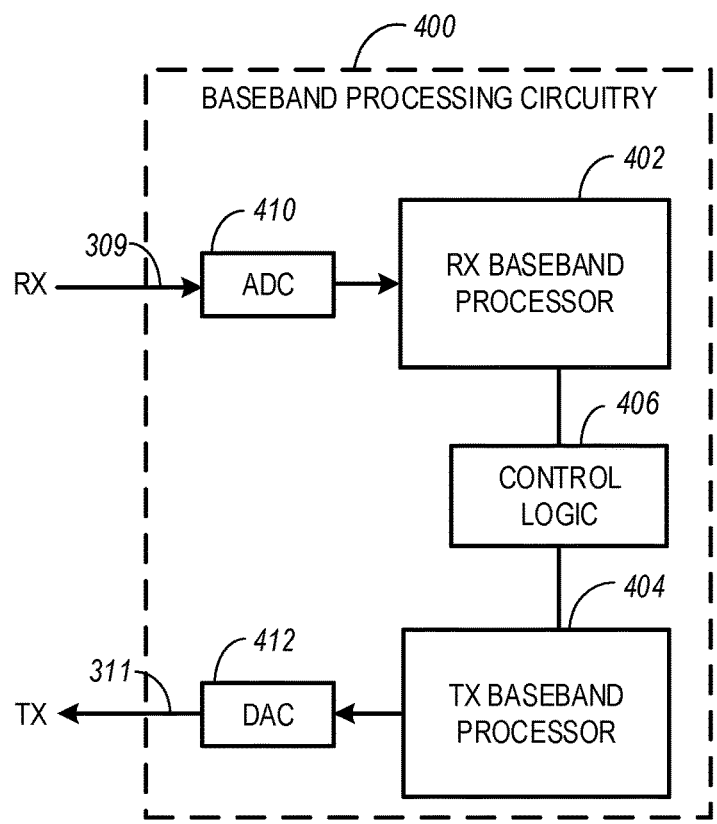
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
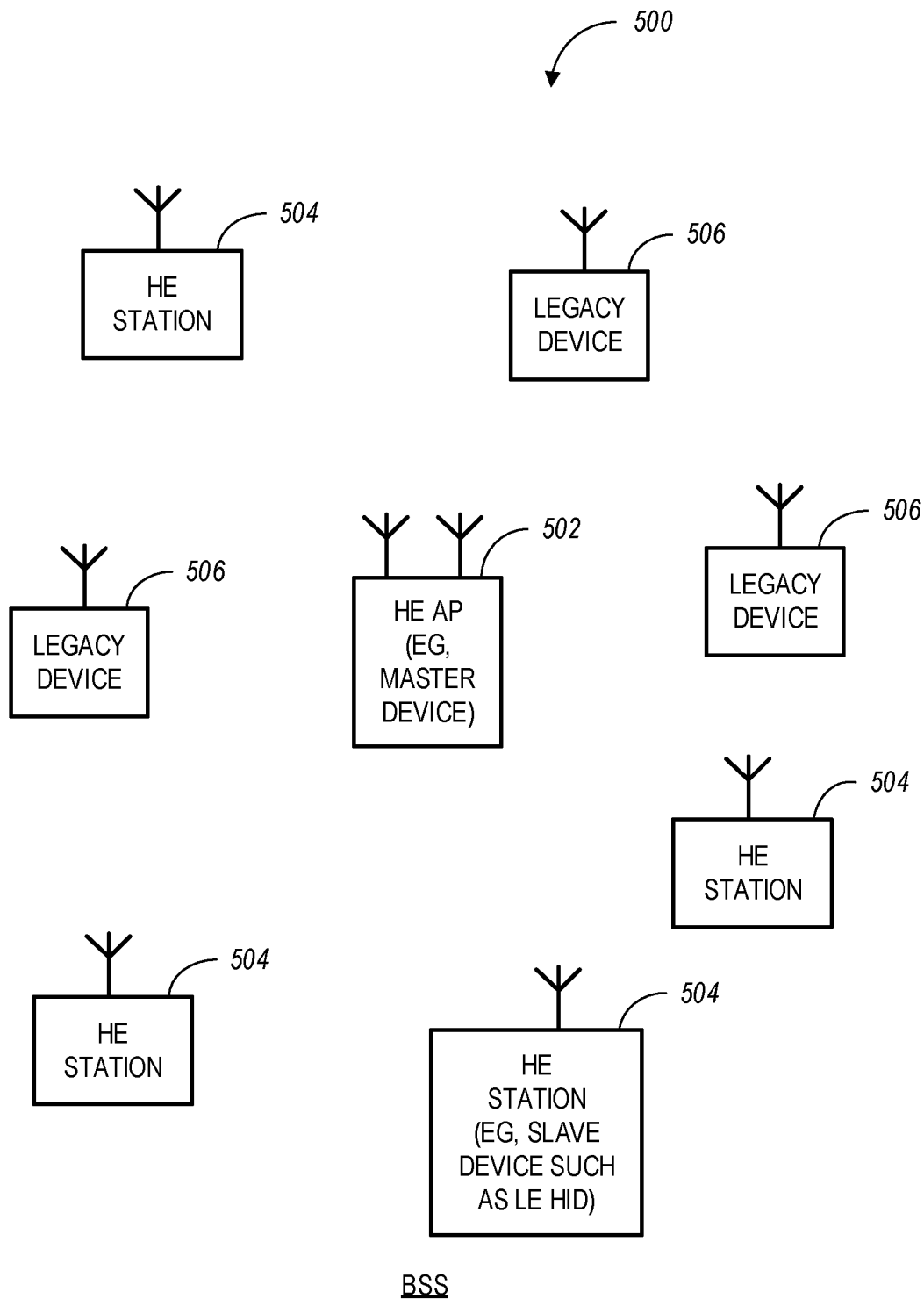
FIG. 5 illustrates a WLAN in accordance with some embodiments.

FIG. 5 illustrates a WLAN 500 in accordance with some embodiments. The WLAN 500 may comprise a basic service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

In some aspects, the AP 502 can include a primary device and the station 504 can include a secondary device. For example, the AP 502 can include a computing device such as a wired or wireless device configured to perform one or more of the techniques discussed herein. The station 504 can be configured as a secondary device to the AP 502 and can include LE HID types of devices or another type of wired or wireless device that is coupled to the AP 502 in a secondary configuration.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a Physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments, the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). Allocation of bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz, and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a primary station which may be arranged to contend for a wireless medium (e.g., during a contention period) to receive exclusive control of the medium for a HE control period. In some embodiments, the HE control period may be termed a transmission opportunity (TXOP). The HE AP 502 may transmit a HE primary-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than multiple access techniques. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the primary-sync transmission. In some embodiments, the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of the trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments, the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-13.

In example embodiments, the HE station 504 and/or the HE AP 502 are configured to perform the methods and operations/functions described herein in conjunction with FIGS. 1-13. In example embodiments, an apparatus of the HE station 504 and/or an apparatus of the HE AP 502 are configured to perform the methods and functions described herein in conjunction with FIGS. 1-13. The term Wi-Fi may refer to one or more of the IEEE 802.11 communication standards. AP and STA may refer to HE access point 502 and/or HE station 504 as well as legacy devices 506.

In some embodiments, a HE AP 502 or a HE STA 504 performing at least some functions of a HE AP 502 may be referred to as HE AP STA. In some embodiments, a HE STA 504 may be referred to as a HE non-AP STA. In some embodiments, a HE STA 504 may be referred to as either a HE AP STA and/or HE non-AP.

Figure 6:
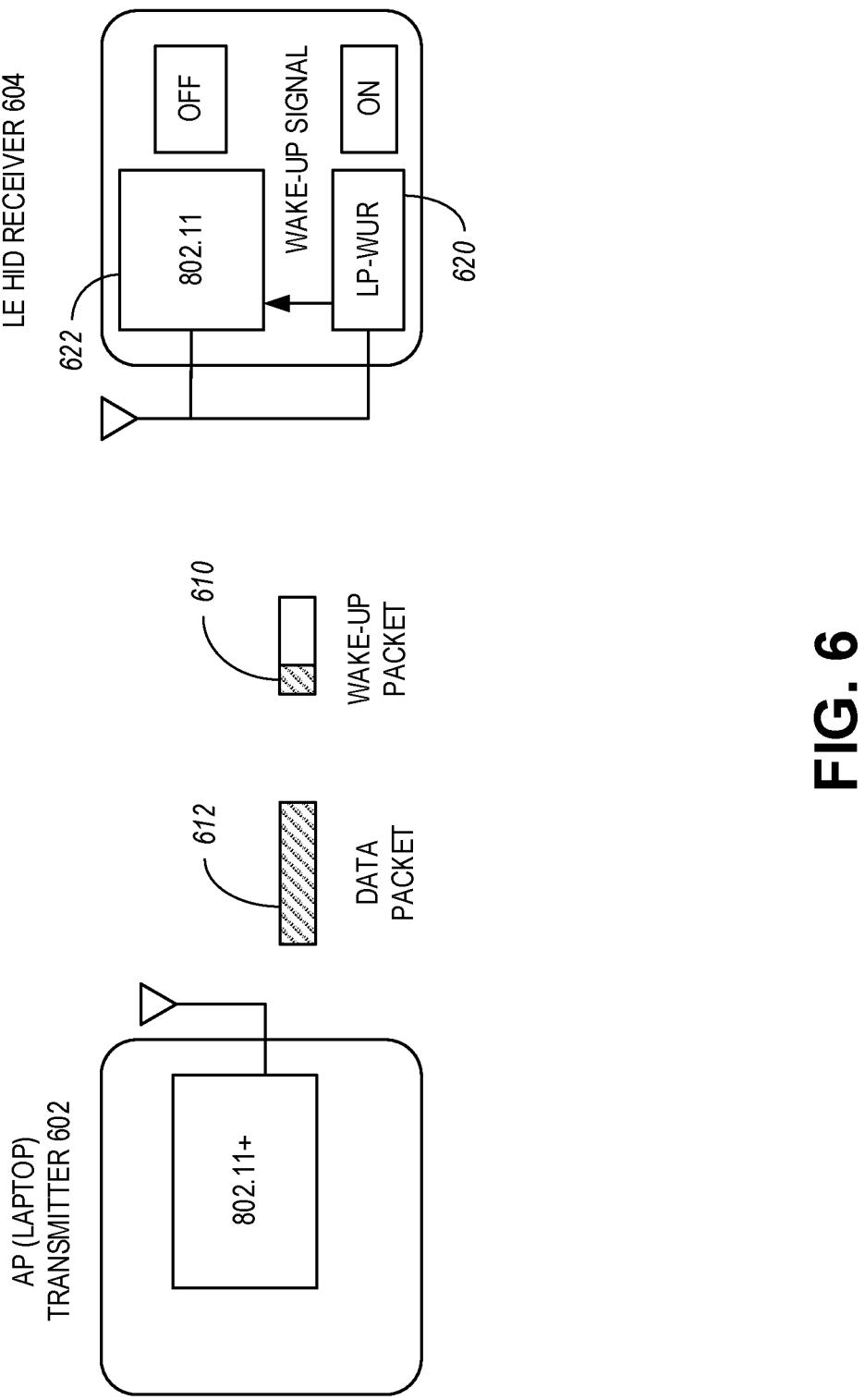
FIG. 6 illustrates an example of a low power wake-up receiver (LP-WUR) for a Wi-Fi device, in accordance with some embodiments.

In some embodiments, a low power wake up receiver (LP-WUR) enables an ultra-low power mode of operation for a Wi-Fi device. In some embodiments, systems/devices/methods described below provide for a device to have a minimum radio configuration that can receive a wake-up packet from a peer. Once the wake-up packet is received, the device may wake up a transceiver, e.g., a primary connectivity radio, that may be used to send and receive data. Hence, the device can stay in low power mode until receiving the wake-up packet. An example system including a Wi-Fi, i.e., (802.11) device is shown in FIG. 6, which illustrates an example of a low power wake-up receiver (LP-WUR) 620 for Wi-Fi, e.g. (IEEE 802.11) device 604, in accordance with some embodiments. The device 604 includes the LP-WUR 620 as well as a primary connectivity radio 622. The device 604 may operate in a low power mode where the primary connectivity radio 622 is powered off. In some embodiments, the state of the primary connectivity radio 622, as viewed from a transmitter 602, is off in the low power mode. The primary connectivity radio 622 may send and receive data while the device 604 is in low power mode.

In an example, when the transmitter 602 wants to wake up the device 604, the transmitter sends a wake-up packet 610 to the LP-WUR 620. Upon receipt, the LP-WUR sends a wake-up signal to a controller or directly to the primary connectivity radio 622. The primary connectivity radio 622 may then power up to be able to receive data, e.g., a data packet 612. In an example, the wake-up packet 610 may be sent based upon a duty cycle or based upon when the transmitter 602 needs to send data to the device 604.

In some embodiments, systems/devices/methods described herein may provide additional signaling to indicate the wake-up receiver (WURx) state transition, which can be independent of the existing transition for power states and power management modes. The WURx may operate in various power management modes that may be used to determine the state of the WURx. In an example, the WURx state may be always on or in duty-cycle mode. In duty-cycle mode, the WURx cycles between being active for a period of time and inactive for a period of time. Additional signaling may be introduced from the STA to AP to indicate the transition of power management mode and/or WURx state.

The different power management modes for the WURx may have different corresponding rules for the WURx state transition. In an example, the rules may follow the definition of power management mode for an 802.11 radio. In an example, the WURx state transition is viewed from the AP's perspective and may not be the actual WURx state of the STA since the STA may go through the localized operation of WURx state.

In various examples, an STA can be in one of two power states: awake or doze. In the awake state, the STA is fully powered. For example, the primary connectivity radio may be fully powered to send/receive data. The WURx, however, may be powered off in the awake state. In the doze state, the primary connectivity radio may be powered off. From the perspective of the AP, the AP assumes the STA is not able to send or receive data, other than receive a wake-up packet.

A non-AP STA can be in one of two power management modes: active mode or power save mode. In the active mode, the STA may receive and transmit frames at any time. In active mode, the STA remains in the awake state. In the power save mode, the STA enters the awake state to receive or transmit data/frames. The STA returns and remains in the doze state, otherwise.

In various embodiments, the AP has the capability to send the wake-up packet to the WURx of the STA to wake up the primary connectivity radio of the STA. The concept, however, may be extended to the general device to the device model, where STA1 has the capability to send the wake-up packet to the WURx of the STA2 to wake up the primary connectivity radio of the STA2. In some embodiments, systems/devices/methods described herein can provide two power management modes and introduce signaling to indicate the transition of power management modes and/or states of the WURx to STA1. In some embodiments, the WURx of an STA may be in one of two power states. In a WURx awake state, the STA may receive wake-up receiver transmission, such as wake-up packets and/or beacons. In a WURx doze state, the STA does not receive wake-up receiver transmissions. For example, the WURx may be powered off to conserve power.

In some embodiments, the WURx of an STA may be operated in one of two power management modes. In a WURx active mode, the STA remains in the WURx awake state to receive wake-up receiver transmissions. In the WURx power save mode, the STA enters the WURx awake state to receive wake-up receiver transmissions, and then otherwise remains in the WURx doze state.

In some embodiments, systems/devices/methods described herein provide rules to define the WURx state transition. In some embodiments, the WURx state transition is defined from the perspective of the other side, e.g., AP. In some embodiments, the STA may do localized operations even when the AP believes the WURx to be in a doze state. For example, if from the AP's perspective, the WURx is off, the STA may keep the WURx powered on to simplify the operation. In an example, the STA may not need to notify the AP. Specifically, when the STA is in the doze state from the AP's perspective, the STA may be in an awake state to deal with other operations. As another example, when the STA is in the awake state from AP's perspective, the STA may be in doze due to mechanisms like intra-BSS PPDU power save.

In some embodiments, systems/devices/methods described herein may provide a rule for the relation of the WURx state and the power save state from AP's perspective. From the AP's perspective, if the STA is in the awake state, then AP shall treat the WURx of STA as off, e.g., the AP shall not send a wake-up packet to the STA. From the AP's perspective, if the STA is in the doze state, then the WURx status is determined by the power management mode of the STA. When the STA indicates it is operating in the WURx active mode, then the WURx is on. If STA indicates it is operating in the WURx Power save mode, then the state of the WURx is indicated based on the duty cycle signaling as described in some embodiments. The duty cycle is used to determine when the WURx is on or off In some embodiments, after the AP sends the wake-up packet the WURx state of the STA from AP's perspective does not change until the AP receives an acknowledgment from the STA for the wake-up packet. Until the acknowledgment is received, the state of the STA follows the existing signaling from the STA. In some embodiments, the power save state of the STA from AP's perspective after AP sends the wake-up packet until AP gets acknowledgment from the STA for the wake-up packet is the doze state. In some embodiments, the benefit of this approach is that all the current 802.11 power save protocols is not changed.

Figure 7:
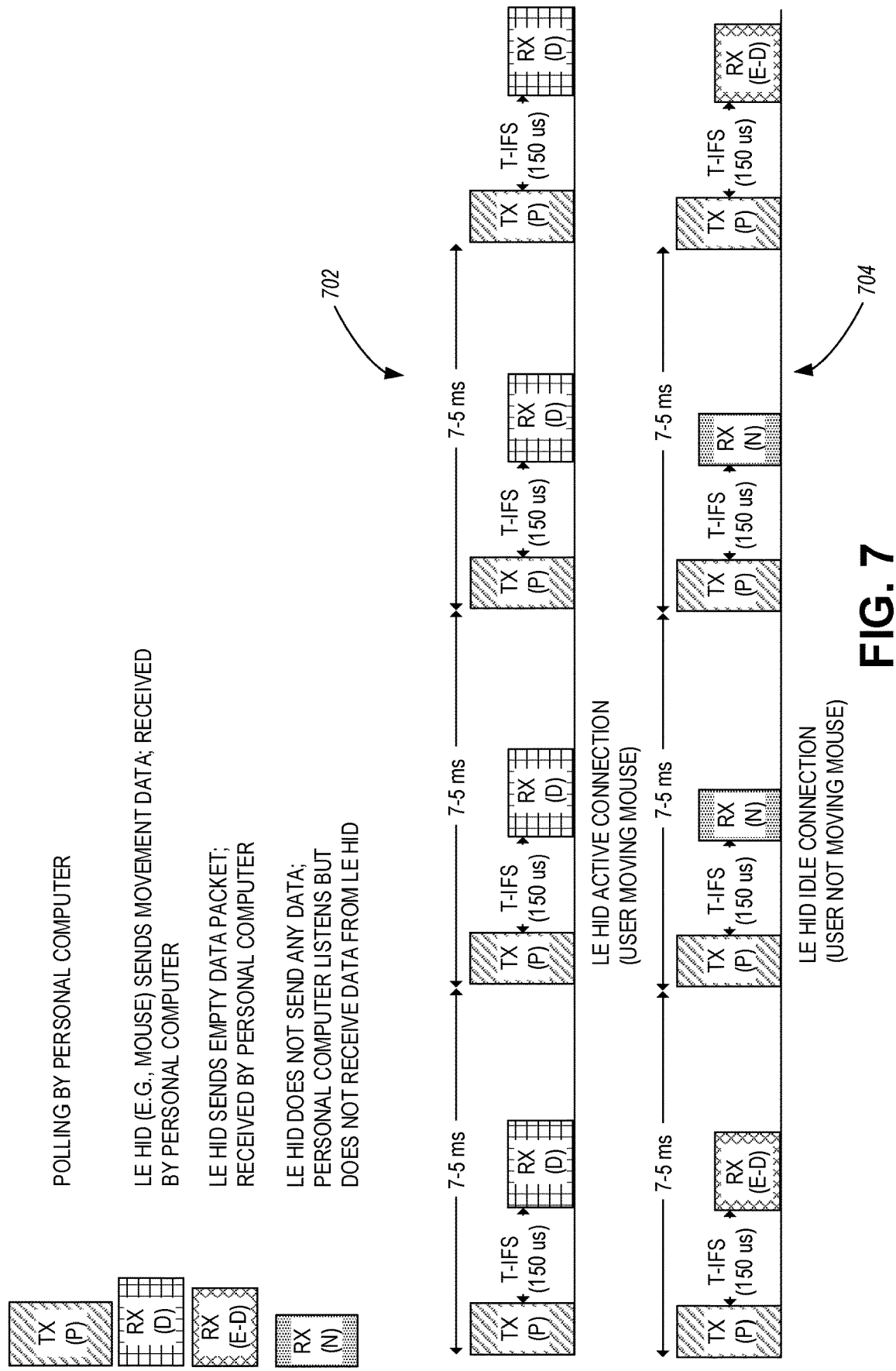
FIG. 7 illustrates a timing diagram of example LE HID active and idle connections, in accordance with some embodiments.

FIG. 7 illustrates timing diagrams 702 and 704 of example LE HID active and idle connections, in accordance with some embodiments. In some examples and techniques are discussed herein in reference to a personal computer (as a primary device) and a LE HID (such as a mouse, as the secondary device) the disclosure is not limited in this regard and other types of primary and secondary devices can be used in connection with the discussed techniques.

In some aspects, a connection between a personal computer and a LE HID mouse may be configured with air activity (e.g., communication of a polling signal by the computer and transmission of movement data by the mouse) every 7.5 ms (this periodicity may be a typical configuration that may be used by LE HID mice and is referred herein as air activity instance or connection interval). As illustrated in diagrams 702 and 704 in FIG. 7, the air activity instance may include the following communications:

(a) The personal computer polling the mouse for any mouse movement data that mouse may have to send to personal computer (this is the polling message mitigated by the personal computer, indicated as TX (P) in FIG. 7); and (b) The mouse optionally responding to the polling message of the personal computer with the mouse movement data that may be available (indicated as RX (D) in FIG. 7).

In some aspects, a connection configuration may be used to control how many air activity instances a mouse may skip listening to and responding to. The mouse may use this configuration to conserve its battery when it is idle and does not have any data to send to the personal computer.

Timing diagram 702 illustrates air activity instances for a LE HID active connection (e.g., a user is moving the mouse and movement/position data is indicated to the personal computer in response to the polling messages).

Timing diagram 704 illustrates air activity instances for an LTE HID idle connection (e.g., the user is not moving the mouse and movement/position data is not being communicated to the personal computer in response to the polling messages). The depicted connections have 7.5 ms periodicity and the mouse may be allowed to skip one or more (e.g., two) consecutive air activity instances when it does not have any data to send. For example and as seen in timing diagram 704, time instances referenced as RX (N) indicate that the LE HID does not communicate any data to the personal computer, and the personal computer listens but does not receive data on the LE HID. This means that the mouse will need to listen to every third activity instance and respond with an empty data packet (e.g., RX (E-D)) for the cases when it is idle.

As depicted in diagrams 702 and 704, the personal computer performs air activity every 7.5 ms for both types of connections, active and idle. This means that there is less than 7.5 ms timing budget for switching in and switching out of any power save modes. Consequently, it may be important to optimize power consumption for idle connection scenarios for the following reasons:

(a) It is possible that the platform enters Modern Connected Standby state (with the display off) and is expected to consume minimal power. For example, 2020 platforms and SOC budget for Modern Connected Standby state (with the display off) are 50 mW and 9 mW respectively.

(b) Idle connection signifies user inactivity which may potentially lead several individual platform components to low power state. When a user becomes active again, there is no expectation to provide the same level of responsiveness instantaneously/during-the-transition that is expected on an active link. In other words, multiple components (e.g., a display, a CPU, memories, input/output interfaces, etc.) in the system might have entered their respective low power modes and transition out of these low power modes will degrade responsiveness momentarily. In this regard, maintaining a 7.5 ms period on HID idle connection may cause a two-fold penalty. First, it is not able to deliver the responsiveness equivalent to an active connection as the remaining system components enter their sleep modes and hence, responsiveness may be deteriorated. Second, LE components may not allow the platform to enter meaningful power save modes even though the remaining components allow that.

Techniques discussed herein are focused on LE HID idle connections rather than active connections, because with active connections it is most likely that other components (e.g., the display rendering the mouse movement) keep the platform in a high power state instead of the LE component. In some aspects, techniques discussed herein maintain the 7.5 ms period on-air activity instances for meeting the active user's responsiveness requirements.

FIG. 8 provides a more detailed review of an example LE architecture within personal computer platforms in order to illustrate that the 7.5 ms timing budget may be a constraint that leads to high platform power consumption. In some aspects, LE technology may be part of a Connectivity (CNV) solution, which provides WiFi, Bluetooth (BT) basic rate (BR)/Extended Data Rate (EDR) (BR/EDR), and LE capabilities to primary device (e.g., personal computer) platforms.

FIG. 8 illustrates a block diagram of a LE architecture 800 of a primary device in communication with a LE HID device, in accordance with some embodiments. Referring to FIG. 8, the LE architecture 800 includes a platform controller hub (PCH) 802 in communication with a CPU system-on-a-chip (SOC) 806 via the PCH-CPU SOC interface 824. The CPU SOC 806 can implement a software stack 826 which can include a Bluetooth host software stack. The PCH 802 includes a power source 808 and a clock source (e.g., a crystal oscillator) 810.

The CNV solution used by the LE architecture 800 may be composed of the following two parts:

(a) A CNV Integrated (CNVi) module 812. The CNVi 812 comprises suitable circuitry, logic, interfaces, and/or code, and is integrated within the PCH 802, implementing WiFi, BT (BR/EDR), and LE MAC layers 818. A support component (CNVi TOP) 816 implements shared resources (e.g., secure boot HW engines, including SHA-256 and RSA), power, and clock delivery scheme. The CNVi 812 further includes a Wi-Fi integrated support module 814.

(b) CNV RF Module (CNVr) 804. The CNVr 804 comprises suitable circuitry, logic, interfaces, and/or code and is configured as an M.2 module implementing WiFi, BT (BR/EDR), and LE PHY and RF layers 832. A support component (CNVr TOP) 830 implements shared resources (e.g., non-volatile memory storage for calibration data), power, and clock delivery. The CNVr 804 further includes a Wi-Fi RF module 828.

The CNVi 812 and the CNVr 804 may be coupled via one or more interfaces 822. In some aspects, the MAC layers 818 may communicate with the Bluetooth host software stack 826 at the CPU SOC 806 via the host transport interface 820 and the PCH-CPU SOC interface 824.

In some aspects, the CNVi 812 may rely for its operation on clock delivery and power delivery from clock source 810 and power source 808 in PCH 802. In some aspects, by focusing on clock source timing requirements, it can be shown that the 7.5 ms timing budget associated with a periodicity of the air activity instances is a constraint to entering meaningful platform power save modes by the primary device.

In some aspects associated with some personal computer platforms, the crystal oscillator (XO) settling time is around 12 ms. In this regard, when the Bluetooth integrated (BTi) component has air activity every 7.5 ms for HID idle connection, it will have to always request/keep the XO in a warm state. When the XO 810 is in a warm state, the lowest power state that the platform can enter is S0i2.2. This is in contrast to our state S0i3.4 that the platform might have entered if the XO was turned off. The PCH power consumption delta between S0i3.4 and S0i2.2 power states is 17 mW, which is a significant delta for platform Modern Connected Standby state (with the display off) and considering aggressive power consumption targets that may be associated with this state.

In order to alleviate the above-described constraint, techniques disclosed herein may include decreasing the frequency of air activity to allow longer inactivity/quiet period (e.g., change the periodicity of the polling signals by skipping one or more air activity instances). The air activity for active and idle connections is illustrated in FIG. 9.

FIG. 9 illustrates timing diagrams 902 and 904 of example LE HID active and idle connections with air activity optimized in the idle connection, in accordance with some embodiments. As illustrated by diagram 902, there is no change in the active connection's air activity.

However, as illustrated by diagram 904, the LE HID idle connection is associated with the transmission of polling signals with a longer periodicity which can be achieved by skipping one or more air activity instances. The longer quiet periods on the idle connection in diagram 904 allow the BTi to release platform power and clock resources. Continuing with the XO settling time issue, the longer quiet period between transmission of polling signals means that the XO can be turned off and the platform can enter deeper sleep modes (e.g., S0i3.4 state) and stay in the deeper sleep mode for a meaningful time duration. This in turn greatly improves the platform power consumption.

In some aspects, as an initial step in performing the discussed techniques for improving a power-optimized idle connection with a LE HID, a decision on connection idleness associated with a communication link between the primary device and the LE HID can be performed. A subsequent decision on how many air activity instances can be skipped may be performed when it is determined that the connection with the LE HID is idle. In some aspects, performing these decisions may be configured to ensure that there is no negative implication to user responsiveness.

Connection Idleness Decision

In some aspects, connection idleness is determined when the following two conditions are satisfied: (1) the host transport interface 820 is in a low power mode, such as in Selective Suspend state; and (2) the LE HID device either did not respond to a polling signal or responded only with an empty packet within a configured response time (e.g., one second).

Referring again to FIG. 8, the host transport interface 820 between the MAC layer 818 and the Bluetooth host software stack 826 in the CPU SOC 806 can include one or more of the following: a USB interface, a USB transceiver microcell interface (UTMI), or a peripheral component interconnect express (PCIE) interface. In aspects when the host transport interface 820 is a USB interface or UTMI, the low power mode of the interface can include a selective suspend state. In aspects when the host transport interface 820 is a PCIE interface, the low-power mode of the interface can include a device low-power mode state such as a D3 state.

Regarding the first condition for determining connection idleness, the host transport interface 820 being in Selective Suspend state indicates that the operating system has determined BT (BR/EDR and LE) to be inactive from the user operation perspective. The operating system (e.g., software stack on the CPU SOC 806) makes this decision when there is no BT (BR/EDR and LE) traffic over the host transport interface 820 for a predefined period of time (e.g., for 2 seconds). The host transport interface 820 is in a low-power mode (e.g., being in a Selective Suspend state) also indicates that the platform could enter low power state if other platform components would allow that. More specifically, some of the system components (including the host transport interface 820) transition to low power states and hence, next HID activity would cause transition of these components from their low power state to active state and hence, will see responsiveness degradation.

Additional/incremental user responsiveness degradation by decreasing the HID activity frequency on an idle connection is not perceivable by the user and hence, taking USB state in the account, safeguarding against perceivable user responsiveness degradation may be achieved.

Regarding the second condition for determining connection idleness, after the host transport interface is determined to be idle and placed in a low-power state, absence of user data from the HID device for a preconfigured time period may be used to determine that the LE HID device is not actively being used and no positioning/movement data is medicated back to the primary device. In this regard, a determination can be made in the primary device that the HID device either did not respond to a polling signal or response with an empty packet within a preconfigured time (e.g., 1 second). After both the first and second conditions are satisfied, a determination can be made on how to adjust the periodicity of air activity instances (e.g., determine how many air activity instances to skip so that a polling signal is transmitted with higher periodicity).

How to adjust the periodicity of the polling signal (e.g., how many air activity instances to skip)

In some aspects, the power KPI benefit can be determined even by skipping one of the air activity instances. In some aspects, in order to decide how many instances are safe to skip, we look at the incremental latency (e.g., 30 ms) that the LE component could introduce without adding perceivable latency to the use case. More specifically, the incremental latency may be minimal compared to the already existing latency introduced by other components (e.g., USB, display, CPU, IOs, etc.) being in sleep mode.

In some aspects, the number of skipped instances is calculated as follows: the number of instances that could be skipped=Floor [Tolerable incremental latency/connection period]−1. For example, for an HID use case with a 7.5 ms air activity period and incremental latency tolerance (e.g., indicated as T in the examples below) of 30 ms, the number of skipped instances would be 3.

In some aspects, the skip interval may also be carefully selected in order to honor the HID wake up periods. If the skip interval is not aligned to the HID device wake up period, it would result in HID wake up misses a poll from the PC and then continues to stay awake until the skip interval. This is undesirable since it would deplete the HID batteries much faster.

Bluetooth Low Energy supported HID (Human Interface Device) profile for serving devices such as a mouse, keyboard or other pointing or character devices, typically require low bitrate and low latency. To achieve the quality of service requirement of low latency, the HID profile configures Bluetooth Low Energy transport to use s relatively short connection event interval. Typical connection intervals are 7.5 ms, 15 ms, 11.25 ms, or 22.5 ms. In HID over Bluetooth Low Energy, the peripheral devices (e.g., mouse, keyboard) are taking the secondary role, while the PC as a central device is taking the primary role. The PC is required to poll the HID devices on every connection event interval (e.g., as illustrated in FIG. 9).

In some aspects, the HID peripheral devices may negotiate a secondary latency parameter (S). A secondary latency parameter is an integer number and its units in a number of connection event intervals. The secondary latency parameter allows the secondary devices to wake up and listen once every number of secondary latency numbers of connection event interval. Typically, the secondary latency is in the order of a few dozens. For example, a mouse with a 7.5 ms connection events interval may request secondary latency of 60. In this example, when the mouse is at rest, it may wake up once every 60 connection intervals (e.g., once every 450 ms) to respond with an empty packet to the primary device polling signal. The PC, on the other hand, is polling in every connection interval (e.g., may be indicated as D, with D being 7.5 ms). Once a user is moving the mouse, the mouse may send packets immediately with HID data (X, Y coordinates and button presses). Therefore, the PC is polling the secondary device, to enable the low latency quality of service requirement.

When selecting skip poll which is not aligned to the HID secondary device latency, it would force the HID to remain awake, therefore, the skip period may need to take into account both HID wake up interval, and both the PC platform suspends wake up threshold.

In some aspects, a suspend wake threshold T may be defined to be the time in ms which is allowed to be skipped while meeting a low latency quality of service requirement. Let T be the threshold mentioned above (e.g., incremental latency tolerance), let S be the secondary device latency parameter, and let D be the connection interval or air activity instances duration (in ms). Parameter P may be determined as the HID polling skip latency (e.g., how many air activity instances to skip before transmitting a polling signal again) using the following algorithm listed in Table 1:

TABLE 1

P = 0
for skip in range (2, S/2):
   if modulo (S, skip) == 0 then P= (S/skip) //search for P as largest divisor of S;
      if P*D < T then break //stop condition;
If P=0 or((P*D) > T) then P=1 //in case, no divisor found, or new poll exceeds suspend wake threshold.

In this regard, the result is a skip HID poll value which allows the PC platform in suspend to sleep for a longer period, while still wake up in case of an HID gesture.

FIG. 10 illustrates a timing diagram 1002 of skipped primary device polling transmissions, in accordance with some embodiments. More specifically, FIG. 10 illustrates an example where salve latency D=7.5 ms; S=24 (180 ms secondary device latency); T=55 ms. In this case, the above algorithm found P=6 and stopped on this condition since P*D=45 ms<T=55 ms. In this example, the PC may sleep for s duration of 45 ms instead of 7.5 ms. Time to wake up from suspend is around 70 ms to 100 ms (humanly noticeable wake-up lag is around 200 ms).

In this regard, the result is that secondary device latency is honored, while response time is low and allows wake up quickly in case of mouse gesture. The PC, as a primary device, would align its skip HID polls on the responses it received got from the HID secondary device, while in suspend state. When a mouse attempts to wake up and sends HID data, it would appear in every connection interval until it receives the PC primary polls, when the primary receives a non-empty packet from the secondary device (containing HID data). The HID would then stop skipping HID polls and poll on every connection interval. The skip poll is enabled back only when the secondary device sends empty packets for a few secondary latency cycles (hysteresis). This may be achieved by applying a timeout value before applying the skip HID polls. Using the above techniques, a primary device may save significant power while honoring the HID low latency on wake up.

FIG. 11 is a flow diagram of a method 1100 for optimizing power consumption in a wireless device in an idle connection with another wireless device, in accordance with some embodiments. Referring to FIG. 11, the method 1100 includes operations 1102, 1104, 1106, and 1108 which may be performed by processing circuitry of a primary device, such as the CPU SOC 806 in FIG. 8.

At operation 1102, a polling signal is encoded for periodic transmission to a second (secondary) device during each air activity instance of a plurality of air activity instances. For example and as illustrated in FIG. 9, polling signals can be transmitted by the primary device to the LED HID every air activity instance (e.g., every 7.5 ms). At operation 1104, the processing circuitry of the first (primary) device can detect whether an interface of the first device (e.g., the host transport interface 820) between a media access control (MAC) layer (e.g., 818) and a software stack of a communication protocol (e.g., the Bluetooth host software stack 826 within the CPU SOC 806) is in a low-power state. The communication protocol (e.g., Bluetooth) is associated with a communication link between the first device and the second device. At operation 1106, the processing circuitry of the primary device can decode an empty packet from the second device (e.g., as illustrated diagram 904). The empty packet is received in response to the polling signal transmitted during an air activity instance of the plurality of air activity instances. At operation 1108, the processing circuitry adjusts periodicity of the periodic transmission of the polling signal based on the low-power state and the decoded empty packet. For example, after it is determined that the host transport interface 820 is in a low-power state (e.g., the interface may be placed in the low-power state based on being idle for a predetermined period of time) and the HID device either did not respond to a polling message or responded with an empty packet, a determination is made on adjusting the periodicity associated with the air activity instances (e.g., how many air activity instances can be skipped so that the periodicity of the polling signal is changed).

Collateral Benefit of the Disclosed Techniques

While the platform power consumption improvement is the primary goal of the disclosed techniques, a secondary benefit is also present. WiFi, BT (BR/EDR), and LE technologies operate in unlicensed 2.4 GHz ISM band and performance degradation of one technology by other due to interference is a key issue. Decreasing the frequency of LE traffic on HID idle connection is bound to improve WiFi performance as the probability of interference decreases. Such performance gain is important in both platform low power and active states.

As the disclosed techniques use host transport interface and HID connection state in order to decrease the frequency of polling, it is possible that the platform is still in active power state and performing some activities over WiFi (file download, Skype call, etc.). In such a scenario, decreased HID frequency will automatically lead to the WiFi performance gain. In case when the platform is in low power state, as Modern Connected Standby state supports WiFi maintaining connection and performing scans, decreased HID frequency may also improve performance over WiFi idle connections and of WiFi scans.

FIG. 12 illustrates a block diagram of an example machine 1200 upon which any one or more of the techniques (e.g., methodologies) discussed herein may perform. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a HE AP 502, HE station 504, personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208.

Specific examples of main memory 1204 include Random Access Memory (RAM), and semiconductor memory devices, which may include, in some embodiments, storage locations in semiconductors such as registers. Specific examples of static memory 1206 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1200 may further include a display device 1210, an input device 1212 (e.g., a keyboard), and a user interface (UI) navigation device 1214 (e.g., a mouse). In an example, the display device 1210, input device 1212 and UI navigation device 1214 may be a touch screen display. The machine 1200 may additionally include a mass storage (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 1202 and/or instructions 1224 may comprise processing circuitry and/or transceiver circuitry.

The storage device 1216 may include a machine-readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 1222 is illustrated as a single medium, the term "machine-readable medium" may include a single medium or multiple media (e.g., a centralized or distributed database, and/or associated caches and servers) configured to store the one or more instructions 1224.

An apparatus of the machine 1200 may be one or more of a hardware processor 1202 (e.g., a central processing unit (CPU), a graphics processing unit (GPU), a hardware processor core, or any combination thereof), a main memory 1204 and a static memory 1206, sensors 1221, network interface device 1220, antennas 1260, a display device 1210, an input device 1212, a UI navigation device 1214, a mass storage 1216, instructions 1224, a signal generation device 1218, and an output controller 1228. The apparatus may be configured to perform one or more of the methods and/or operations disclosed herein. The apparatus may be intended as a component of the machine 1200 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1220 may include one or more physical jacks (e.g., Ethernet, coaxial, or phone jacks) or one or more antennas to connect to the communications network 1226. In an example, the network interface device 1220 may include one or more antennas 1260 to wirelessly communicate using at least one of single-input multiple-output (SIMO), multiple-input multiple-output (MIMO), or multiple-input single-output (MISO) techniques. In some examples, the network interface device 1220 may wirelessly communicate using Multiple User MIMO techniques. The term "transmission medium" shall be taken to include any intangible medium that is capable of storing, encoding or carrying instructions for execution by the machine 1200, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; flash memory, etc.

FIG. 13 illustrates a block diagram of an example wireless device 1300 upon which any one or more of the techniques (e.g., methodologies or operations) discussed herein may perform. The wireless device 1300 may be a HE device. The wireless device 1300 may be a HE STA 504 and/or HE AP 502 (e.g., FIG. 5). A HE STA 504 and/or HE AP 502 may include some or all of the components shown in FIGS. 1-5 and 13. The wireless device 1300 may be an example machine 1200 as disclosed in conjunction with FIG. 12, and may include a primary device (e.g., a laptop or another computing device) or a secondary device (e.g., a computing device coupled to the primary device, such as a LE HID-type device or another type of wired or wireless computing device) configured to perform the discussed functionalities (e.g., in connection with FIGS. 6-11).

The wireless device 1300 may include processing circuitry 1308. The processing circuitry 1308 may include a transceiver 1302, physical layer circuitry (PHY circuitry) 1304, and MAC layer circuitry (MAC circuitry) 1306, one or more of which may enable transmission and reception of signals to and from other wireless devices 1300 (e.g., HE AP 502, HE STA 504, and/or legacy devices 506) using one or more antennas 1312. As an example, the PHY circuitry 1304 may perform various encoding and decoding functions that may include the formation of baseband signals for transmission and decoding of received signals. As another example, the transceiver 1302 may perform various transmission and reception functions such as the conversion of signals between a baseband range and a Radio Frequency (RF) range.

Accordingly, the PHY circuitry 1304 and the transceiver 1302 may be separate components or may be part of a combined component, e.g., processing circuitry 1308. In addition, some of the described functionality related to transmission and reception of signals may be performed by a combination that may include one, any or all of the PHY circuitry 1304 the transceiver 1302, MAC circuitry 1306, memory 1310, and other components or layers. The MAC circuitry 1306 may control access to the wireless medium. The wireless device 1300 may also include memory 1310 arranged to perform the operations described herein, e.g., some of the operations described herein may be performed by instructions stored in the memory 1310.

The antennas 1312 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1312 may be effectively separated to take advantage of spatial diversity and the different channel characteristics that may result.

One or more of the memory 1310, the transceiver 1302, the PHY circuitry 1304, the MAC circuitry 1306, the antennas 1312, and/or the processing circuitry 1308 may be coupled with one another. Moreover, although memory 1310, the transceiver 1302, the PHY circuitry 1304, the MAC circuitry 1306, the antennas 1312 are illustrated as separate components, one or more of memory 1310, the transceiver 1302, the PHY circuitry 1304, the MAC circuitry 1306, the antennas 1312 may be integrated in an electronic package or chip.

In some embodiments, the wireless device 1300 may be a mobile device as described in conjunction with FIG. 13. In some embodiments, the wireless device 1300 may be configured to operate in accordance with one or more wireless communication standards as described herein (e.g., as described in conjunction with FIGS. 1-5 and 12, IEEE 802.11). In some embodiments, the wireless device 1300 may include one or more of the components as described in conjunction with FIG. 13 (e.g., a display device 1310, input device 1312, etc.) Although the wireless device 1300 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 1300 may include various components of the wireless device 1300 as shown in FIG. 13 and/or components from FIGS. 1-5 and 12. Accordingly, techniques and operations described herein that refer to the wireless device 1300 may be applicable to an apparatus for a wireless device 1300 (e.g., HE AP 502 and/or HE STA 504), in some embodiments. In some embodiments, the wireless device 1300 is configured to decode and/or encode signals, packets, and/or frames as described herein, e.g., PPDUs.

In some embodiments, the MAC circuitry 1306 may be arranged to contend for a wireless medium during a contention period to receive control of the medium for a HE TXOP and encode or decode a HE PPDU. In some embodiments, the MAC circuitry 1306 may be arranged to contend for the wireless medium based on channel contention settings, a transmitting power level, and a clear channel assessment level (e.g., energy detect level).

The PHY circuitry 1304 may be arranged to transmit signals in accordance with one or more communication standards described herein. For example, the PHY circuitry 1304 may be configured to transmit a HE PPDU. The PHY circuitry 1304 may include circuitry for modulation/demodulation, upconversion/downconversion, filtering, amplification, etc. In some embodiments, the processing circuitry 1308 may include one or more processors. The processing circuitry 1308 may be configured to perform functions based on instructions being stored in a RANI or ROM, or based on special-purpose circuitry. The processing circuitry 1308 may include a processor such as a general-purpose processor or special-purpose processor. The processing circuitry 1308 may implement one or more functions associated with antennas 1312, the transceiver 1302, the PHY circuitry 1304, the MAC circuitry 1306, and/or the memory 1310. In some embodiments, the processing circuitry 1308 may be configured to perform one or more of the functions/operations and/or methods described herein.

In mmWave technology, communication between a station (e.g., the HE stations 504 of FIG. 5 or wireless device 1300) and an access point (e.g., the HE AP 502 of FIG. 5 or wireless device 1300) may use associated effective wireless channels that are highly directionally dependent. To accommodate the directionality, beamforming techniques may be utilized to radiate energy in a certain direction with a certain beam width to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in Omni-directional propagation.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

ADDITIONAL NOTES AND EXAMPLES

Example 1 is an apparatus of a first wireless device, the apparatus comprising: memory; and processing circuitry coupled to the memory, the processing circuitry configured to encode a polling signal for periodic transmission to a second wireless device during each air activity instance of a plurality of air activity instances; detect an interface of the wireless device between a media access control (MAC) layer and a software stack of a communication protocol is in a low-power state, the communication protocol associated with a communication link between the first wireless device and the second wireless device; decode an empty packet from the second wireless device, the empty packet received in response to the polling signal transmitted during an air activity instance of the plurality of air activity instances; and adjust periodicity of the periodic transmission of the polling signal based on the detected low-power state and the decoded empty packet.

In Example 2, the subject matter of Example 1 includes, wherein the processing circuitry is further configured to increase the periodicity of the periodic transmission of the polling signal by skipping transmissions of the polling signal during a threshold number of air activity instances.

In Example 3, the subject matter of Example 2 includes, wherein the processing circuitry is further configured to determine the threshold number of air activity instances based on a duration of the air activity instance and an incremental latency tolerance associated with the second wireless device.

In Example 4, the subject matter of Examples 2-3 includes, wherein the processing circuitry is further configured to determine the threshold number of air activity instances based on a suspend wake threshold of the first wireless device, the suspend wake threshold is a duration of a time interval with suspended transmission of the polling signal, the suspended transmission satisfying a low latency quality of service requirement.

In Example 5, the subject matter of Examples 2-4 includes, wherein the processing circuitry is further configured to determine the threshold number of air activity instances based on a secondary device latency parameter associated with the second wireless device, the secondary device latency parameter indicating a number of consecutive air activity instances of the plurality of air activity instances that the second wireless device may skip listening to.

In Example 6, the subject matter of Examples 1-5 includes, wherein the first wireless device is a primary device, and the second wireless device is a secondary device.

In Example 7, the subject matter of Example 6 includes, wherein the secondary device is low energy (LE) human interface device (HID), and wherein the communication link between the primary device and the secondary device is a Bluetooth communication link.

In Example 8, the subject matter of Examples 1-7 includes, wherein the communication protocol is a Bluetooth communication protocol comprising a Bluetooth physical interface (PHY) layer and a Bluetooth MAC layer.

In Example 9, the subject matter of Examples 1-8 includes, wherein the interface between the MAC layer and the software stack of the communication protocol is one of the following: a universal serial bus (USB) interface; a USB transceiver macrocell interface (UTMI); and a peripheral component interconnect express (PCIE) interface.

In Example 10, the subject matter of Example 9 includes, wherein the low-power state is one of the following: a selective suspend state when the interface between the MAC layer and the software stack of the communication protocol is the USB interface or the UTMI; and a device low power (D) state when the interface between the MAC layer and the software stack of the communication protocol is the PCIE interface.

In Example 11, the subject matter of Examples 1-10 includes, wherein the processing circuitry is further configured to place the interface between the MAC layer and the software stack in the low-power state when the communication link between the first wireless device and the second wireless device is idle for a pre-determined threshold duration.

In Example 12, the subject matter of Examples 1-11 includes, wherein the processing circuitry is further configured to determine the communication link between the first wireless device and the second wireless device is idle when the interface between the MAC layer and the software stack is in the low-power state and the empty packet is received in response to the polling signal.

In Example 13, the subject matter of Examples 1-12 includes, wherein the processing circuitry is further configured to determine the communication link between the first wireless device and the second wireless device is idle when the interface between the MAC layer and the software stack is in the low-power state and a physical (PHY) layer of the communication protocol fails to receive a packet in response to the polling signal.

In Example 14, the subject matter of Example 13 includes, wherein the processing circuitry is further configured to increase the periodicity of the periodic transmission of the polling signal based on the determining that the communication link is idle.

Example 15 is a non-transitory computer-readable medium comprising instructions to cause a first station (STA), upon execution of the instructions by processing circuitry of the first STA, to: encode a polling signal for periodic transmission to a second STA during each air activity instance of a plurality of air activity instances; detect an interface of the first STA between a media access control (MAC) layer and a software stack of a communication protocol is in a low-power state, the communication protocol associated with a communication link between the wireless device and the second wireless device; decode an empty packet from the second STA, the empty packet received in response to the polling signal transmitted during an air activity instance of the plurality of air activity instances; and adjust periodicity of the periodic transmission of the polling signal based on the detected low-power state and the decoded empty packet.

In Example 16, the subject matter of Example 15 includes, wherein the instructions further cause the first STA to increase the periodicity of the periodic transmission of the polling signal by skipping transmissions of the polling signal during a threshold number of air activity instances.

In Example 17, the subject matter of Example 16 includes, wherein the instructions further cause the first STA to determine the threshold number of air activity instances based on a duration of the air activity instance and an incremental latency tolerance associated with the second wireless device.

In Example 18, the subject matter of Examples 16-17 includes, wherein the instructions further cause the first STA to determine the threshold number of air activity instances based on a suspend wake threshold of the wireless device, the suspend wake threshold is a duration of a time interval with suspended transmission of the polling signal, the suspended transmission satisfying a low latency quality of service requirement.

In Example 19, the subject matter of Examples 16-18 includes, wherein the instructions further cause the first STA to determine the threshold number of air activity instances based on a secondary device latency parameter associated with the second wireless device, the secondary device latency parameter indicating a number of consecutive air activity instances of the plurality of air activity instances that the second wireless device may skip listening to.

In Example 20, the subject matter of Examples 15-19 includes, wherein the interface between the MAC layer and the software stack of the communication protocol is one of the following: a universal serial bus (USB) interface; a USB transceiver macrocell interface (UTMI); and a peripheral component interconnect express (PCIE) interface.

In Example 21, the subject matter of Example 20 includes, wherein the low-power state is one of the following: a selective suspend state when the interface between the MAC layer and the software stack of the communication protocol is the USB interface or the UTMI; and a device low power (D) state when the interface between the MAC layer and the software stack of the communication protocol is the PCIE interface.

Example 22 is a method for configuring polling signal transmission by a first wireless device, the method comprising: encoding a polling signal for periodic transmission to a second wireless device during each air activity instance of a plurality of air activity instances; detecting an interface of the first wireless device between a media access control (MAC) layer and a software stack of a communication protocol is in a low-power state, the communication protocol associated with a communication link between the first wireless device and the second wireless device; decoding an empty packet from the second wireless device, the empty packet received in response to the polling signal transmitted during an air activity instance of the plurality of air activity instances; and adjusting periodicity of the periodic transmission of the polling signal based on the detected low-power state and the decoded empty packet.

In Example 23, the subject matter of Example 22 includes, increasing the periodicity of the periodic transmission of the polling signal by skipping transmissions of the polling signal during a threshold number of air activity instances.

In Example 24, the subject matter of Examples 22-23 includes, determining the communication link between the first wireless device and the second wireless device is idle when the interface between the MAC layer and the software stack is in the low-power state and a physical (PHY) layer of the communication protocol fails to receive a packet in response to the polling signal.

In Example 25, the subject matter of Example 24 includes, increasing the periodicity of the periodic transmission of the polling signal based on determining that the communication link is idle.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a first wireless device, the apparatus comprising:
   memory; and
   processing circuitry coupled to the memory, the processing circuitry configured to:
      encode a polling signal for periodic transmission to a second wireless device during each air activity instance of a plurality of air activity instances;
      detect a host transport interface of the first wireless device between a media access control (MAC) layer of the processing circuitry and a software stack of a communication protocol is in a low-power state, the software stack managed by the processing circuitry and the communication protocol associated with a communication link between the first wireless device and the second wireless device;
      decode an empty packet from the second wireless device, the empty packet received in response to the polling signal transmitted during an air activity instance of the plurality of air activity instances; and adjust periodicity of the periodic transmission of the polling signal based on the detected low-power state of the host transport interface and the decoded empty packet.

2. The apparatus of claim 1, wherein the processing circuitry is further configured to:
increase the periodicity of the periodic transmission of the polling signal by skipping transmissions of the polling signal during a threshold number of air activity instances.

3. The apparatus of claim 2, wherein the processing circuitry is further configured to:
determine the threshold number of air activity instances based on a duration of the air activity instance and an incremental latency tolerance associated with the second wireless device.

4. The apparatus of claim 2, wherein the processing circuitry is further configured to:
determine the threshold number of air activity instances based on a suspend wake threshold of the first wireless device, the suspend wake threshold is a duration of a time interval with suspended transmission of the polling signal, the suspended transmission satisfying a low latency quality of service requirement.

5. The apparatus of claim 2, wherein the processing circuitry is further configured to:
determine the threshold number of air activity instances based on a secondary device latency parameter associated with the second wireless device, the secondary device latency parameter indicating a number of consecutive air activity instances of the plurality of air activity instances that the second wireless device may skip listening to.

6. The apparatus of claim 1, wherein the first wireless device is a primary device, and the second wireless device is a secondary device.

7. The apparatus of claim 6, wherein the secondary device is a low energy (LE) human interface device (HID), and wherein the communication link between the primary device and the secondary device is a Bluetooth communication link.

8. The apparatus of claim 1, wherein the communication protocol is a Bluetooth communication protocol comprising a Bluetooth physical interface (PHY) layer and a Bluetooth MAC layer.

9. The apparatus of claim 1, wherein the host transport interface between the MAC layer and the software stack of the communication protocol is one of the following:
a universal serial bus (USB) interface;
a USB transceiver macrocell interface (UTMI); and
a peripheral component interconnect express (PCIE) interface.

10. The apparatus of claim 9, wherein the low-power state is one of the following:
a selective suspend state, when the host transport interface between the MAC layer and the software stack of the communication protocol is the USB interface or the UTMI; and
a device low power (D) state, when the interface between the MAC layer and the software stack of the communication protocol is the PCIE interface.

11. The apparatus of claim 1, wherein the processing circuitry is further configured to:
place the host transport interface between the MAC layer and the software stack in the low-power state when the communication link between the first wireless device and the second wireless device is idle for a predetermined threshold duration.

12. The apparatus of claim 1, wherein the processing circuitry is further configured to:
determine the communication link between the first wireless device and the second wireless device is idle when the host transport interface between the MAC layer and the software stack is in the low-power state and the empty packet is received in response to the polling signal.

13. The apparatus of claim 1, wherein the processing circuitry is further configured to:
determine the communication link between the first wireless device and the second wireless device is idle when the host transport interface between the MAC layer and the software stack is in the low-power state and a physical (PHY) layer of the communication protocol fails to receive a packet in response to the polling signal.

14. The apparatus of claim 13, wherein the processing circuitry is further configured to:
increase the periodicity of the periodic transmission of the polling signal based on the determining that the communication link is idle.

15. A non-transitory computer-readable medium comprising instructions to cause a first station (STA), upon execution of the instructions by processing circuitry of the first STA, to:
encode a polling signal for periodic transmission to a second STA during each air activity instance of a plurality of air activity instances;
detect a host transport interface of the first STA between a media access control (MAC) layer of the processing circuitry and a software stack of a communication protocol is in a low-power state, the software stack managed by the processing circuitry and the communication protocol associated with a communication link between the first STA and the second STA;
decode an empty packet from the second STA, the empty packet received in response to the polling signal transmitted during an air activity instance of the plurality of air activity instances; and
adjust periodicity of the periodic transmission of the polling signal based on the low-power state and the decoded empty packet.

16. The non-transitory computer-readable medium of claim 15, wherein the instructions further cause the first STA to:
increase the periodicity of the periodic transmission of the polling signal by skipping transmissions of the polling signal during a threshold number of air activity instances.

17. The non-transitory computer-readable medium of claim 16, wherein the instructions further cause the first STA to:
determine the threshold number of air activity instances based on a duration of the air activity instance and an incremental latency tolerance associated with the second STA.

18. The non-transitory computer-readable medium of claim 16, wherein the instructions further cause the first STA to:
determine the threshold number of air activity instances based on a suspend wake threshold of the first STA, the suspend wake threshold is a duration of a time interval with suspended transmission of the polling signal, the suspended transmission satisfying a low latency quality of service requirement.

19. The non-transitory computer-readable medium of claim 16, wherein the instructions further cause the first STA to:
determine the threshold number of air activity instances based on a secondary device latency parameter associated with the second STA, the secondary device latency parameter indicating a number of consecutive air activity instances of the plurality of air activity instances that the second STA may skip listening to.

20. The non-transitory computer-readable medium of claim 15, wherein the host transport interface between the MAC layer and the software stack of the communication protocol is one of the following:
a universal serial bus (USB) interface;
a USB transceiver macrocell interface (UTMI); and
a peripheral component interconnect express (PCIE) interface.

21. The non-transitory computer-readable medium of claim 20, wherein the low-power state is one of the following:
a selective suspend state, when the host transport interface between the MAC layer and the software stack of the communication protocol is the USB interface or the UTMI; and
a device low power (D) state, when the host transport interface between the MAC layer and the software stack of the communication protocol is the PCIE interface.

22. A method for configuring polling signal transmission by a first wireless device, the method comprising:
encoding a polling signal for periodic transmission to a second wireless device during each air activity instance of a plurality of air activity instances;
detecting a host transport interface of the first wireless device between a media access control (MAC) layer of processing circuitry of the wireless device and a software stack of a communication protocol is in a low-power state, the software stack managed by the processing circuitry and the communication protocol associated with a communication link between the first wireless device and the second wireless device;
decoding an empty packet from the second wireless device, the empty packet received in response to the polling signal transmitted during an air activity instance of the plurality of air activity instances; and
adjusting periodicity of the periodic transmission of the polling signal based on the low-power state and the decoded empty packet.

23. The method of claim 22, further comprising:
increasing the periodicity of the periodic transmission of the polling signal by skipping transmissions of the polling signal during a threshold number of air activity instances.

24. The method of claim 22, further comprising:
determining the communication link between the first wireless device and the second wireless device is idle when the host transport interface between the MAC layer and the software stack is in the low-power state and a physical (PHY) layer of the communication protocol fails to receive a packet in response to the polling signal.

25. The method of claim 24, further comprising:
increasing the periodicity of the periodic transmission of the polling signal based on the determining that the communication link is idle.

\* \* \* \* \*